(12) United States Patent
Zhou et al.

(10) Patent No.: US 11,516,652 B2
(45) Date of Patent: Nov. 29, 2022

(54) USER EQUIPMENT CAPABILITY AND ENABLEMENT INDICATION FOR DOWNLINK CONTROL INFORMATION (DCI) BASED BEAM AND PATH LOSS (PL) REFERENCE SIGNAL (RS) ACTIVATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/114,043

(22) Filed: Dec. 7, 2020

(65) Prior Publication Data
US 2021/0185512 A1 Jun. 17, 2021

Related U.S. Application Data

(60) Provisional application No. 62/947,878, filed on Dec. 13, 2019.

(51) Int. Cl.
*H04W 8/24* (2009.01)
*H04W 72/04* (2009.01)
(Continued)

(52) U.S. Cl.
CPC .............. *H04W 8/24* (2013.01); *H04B 7/088* (2013.01); *H04L 5/0051* (2013.01); *H04W 72/042* (2013.01); *H04W 72/0413* (2013.01)

(58) Field of Classification Search
CPC . H04W 8/24; H04W 72/0413; H04W 72/042; H04W 72/046; H04W 72/02;
(Continued)

(56) References Cited

U.S. PATENT DOCUMENTS

2018/0167883 A1* 6/2018 Guo ...................... H04W 72/02
2018/0368138 A1* 12/2018 Jung .................. H04W 72/0453
(Continued)

OTHER PUBLICATIONS

"Agreements up to RAN1#99 on Multi-Beam1 (AI 7.2.8.3)", 3GPP Draft; R1-1913604, 3rd Generation Partnership Project (3GPP), Mobile Competence Centre; 650, Route Des Lucioles; F-06921 Sophia-Antipolis Cedex; France, Nov. 27, 2019 (Nov. 27, 2019), pp. 1-11, XP051831459, Retrieved from the Internet: URL: https://ftp.3gpp.org/tsg_ran/WG1_RL1/TSGR1_99/Docs/R1-1913604.zip FL Summary NR_eMIMO RAN1#99-MBI.docx [retrieved on Nov. 27, 2019] Section 2.2.
(Continued)

*Primary Examiner* — Kiet Tang
(74) *Attorney, Agent, or Firm* — Danai Nelisile Mhembere; Patterson & Sheridan, LLP

(57) ABSTRACT

Aspects of the present disclosure provide apparatus, methods, processing systems, and computer readable mediums for enabling downlink control information (DCI) based beam and path loss (PL) reference signal (RS) activation. An example method generally includes reporting, to a network entity, a capability of the UE to support at least one of downlink control information (DCI) based activation of at least one of beam switching, beam activation, or path loss (PL) reference signal (RS) activation; receiving, from the network entity, DCI activating at least one of the beam switching, beam activation, or PL RS; and performing the beam switching, beam activation, or PL RS measurement in response to the DCI.

26 Claims, 8 Drawing Sheets

(51) Int. Cl.
*H04B 7/08* (2006.01)
*H04L 5/00* (2006.01)

(58) Field of Classification Search
CPC ....... H04W 8/22; H04B 7/088; H04B 7/0408; H04B 7/0695; H04B 1/71075; H04L 5/0051; H04L 5/0091; H04L 5/0023
See application file for complete search history.

(56) References Cited

U.S. PATENT DOCUMENTS

| | | | |
|---|---|---|---|
| 2019/0222289 A1 | 7/2019 | John Wilson et al. | |
| 2020/0022161 A1* | 1/2020 | Yang | H04L 5/0087 |
| 2020/0068387 A1* | 2/2020 | Dou | H04B 1/71075 |
| 2020/0351842 A1* | 11/2020 | Lin | H04B 7/086 |

OTHER PUBLICATIONS

Intel Corporation: "Discussion on TCI State Switching Requirements", 3GPP TSG-RAN WG4 Meeting #bis, 3GPP Draft; R4-1902937 TCI State Switching Reqt, 3rd Generation Partnership Project (3GPP), Mobile Competence Centre; 650, Route Des Lucioles; F-06921 Sophia-Antipolis Cedex; France, vol. RAN WG4, No. Xi'an, China; Apr. 8, 2019-Apr. 12, 2019, Apr. 1, 2019 (Apr. 1, 2019), 6 Pages, XP051713432, Retrieved from the Internet: URL: http://www.3gpp.org/ftp/tsg%5Fran/WG4%5FRadio/TSGR4%5F90Bis/Docs/R4%2D1902937%2Ezip [retrieved on Apr. 1, 2019] Section 2.3, Section 2.

International Search Report and Written Opinion—PCT/US2020/063799—ISA/EPO—dated Mar. 16, 2021.

Qualcomm Incorporated: "Remaining Details on QCL", 3GPP TSG RAN WG1 Meeting AH 1801, 3GPP Draft; R1-1800867, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018 (Jan. 13, 2018), XP051385137, pp. 1-8, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018], Section 2.1.2, Section 2, Figures 2-1(c), 2-1(d).

* cited by examiner

USER EQUIPMENT CAPABILITY AND ENABLEMENT INDICATION FOR DOWNLINK CONTROL INFORMATION (DCI) BASED BEAM AND PATH LOSS (PL) REFERENCE SIGNAL (RS) ACTIVATION

CROSS-REFERENCE TO RELATED APPLICATIONS

This application claims benefit to U.S. Provisional Patent Application Ser. No. 62/947,878, entitled "User Equipment Capability and Enablement Indication for Downlink Control Information (DCI) Based Beam and Path Loss (PL) Reference Signal (RS) Activation," filed Dec. 13, 2019 and assigned to the assignee hereof, the contents of which are hereby incorporated by reference in its entirety.

TECHNICAL FIELD

Aspects of the present disclosure relate to wireless communications, and more particularly, to techniques for enabling downlink control information (DCI) based beam and path loss (PL) reference signal (RS) activation.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes reporting, to a network entity, a capability of the UE to support at least one of downlink control information (DCI) based activation of at least one of beam switching, beam activation, or path loss (PL) reference signal (RS) activation, receiving, from the network entity, DCI activating at least one of the beam switching, beam activation, or PL RS, and performing the beam switching, beam activation, or PL RS measurement in response to the DCI.

One innovative aspect of the subject matter described in this disclosure can be implemented in a method for wireless communication by a network entity. The method generally includes receiving, from a user equipment (UE), an indication of a capability of the UE to support at least one of downlink control information (DCI) based activation of at least one of beam switching, beam activation, or path loss (PL) reference signal (RS) activation, and transmitting, to the UE, DCI activating at least one of the beam switching, beam activation, or PL RS.

One innovative aspect of the subject matter described in this disclosure can be implemented in an apparatus for wireless communication by a user equipment (UE). The method generally includes a transmitter configured to transmit, to a network entity, a capability of the UE to support at least one of downlink control information (DCI) based activation of at least one of beam switching, beam activation, or path loss (PL) reference signal (RS) activation, a receiver configured to receive, from the network entity, DCI activating at least one of the beam switching, beam activation, or PL RS, and a processing system configured to perform the beam switching, beam activation, or PL RS measurement in response to the DCI.

One innovative aspect of the subject matter described in this disclosure can be implemented in an apparatus for wireless communication by a network entity. The method generally includes a receiver configured to receive, from a user equipment (UE), an indication of a capability of the UE to support at least one of downlink control information (DCI) based activation of at least one of beam switching, beam activation, or path loss (PL) reference signal (RS) activation, and a transmitter configured to transmit, to the UE, DCI activating at least one of the beam switching, beam activation, or PL RS.

One innovative aspect of the subject matter described in this disclosure can be implemented in an apparatus for wireless communication by a user equipment (UE). The method generally includes means for reporting, to a network entity, a capability of the UE to support at least one of downlink control information (DCI) based activation of at least one of beam switching, beam activation, or path loss (PL) reference signal (RS) activation, means for receiving, from the network entity, DCI activating at least one of the beam switching, beam activation, or PL RS, and means for performing the beam switching, beam activation, or PL RS measurement in response to the DCI.

One innovative aspect of the subject matter described in this disclosure can be implemented in an apparatus for wireless communication by a network entity. The method generally includes means for receiving, from a user equipment (UE), an indication of a capability of the UE to support at least one of downlink control information (DCI) based activation of at least one of beam switching, beam activation, or path loss (PL) reference signal (RS) activation, and means for transmitting, to the UE, DCI activating at least one of the beam switching, beam activation, or PL RS.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for enabling downlink control information (DCI) based beam and path loss (PL) reference signal (RS) activation.

The following description provides examples of DCI-based beam and PL RS activation, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
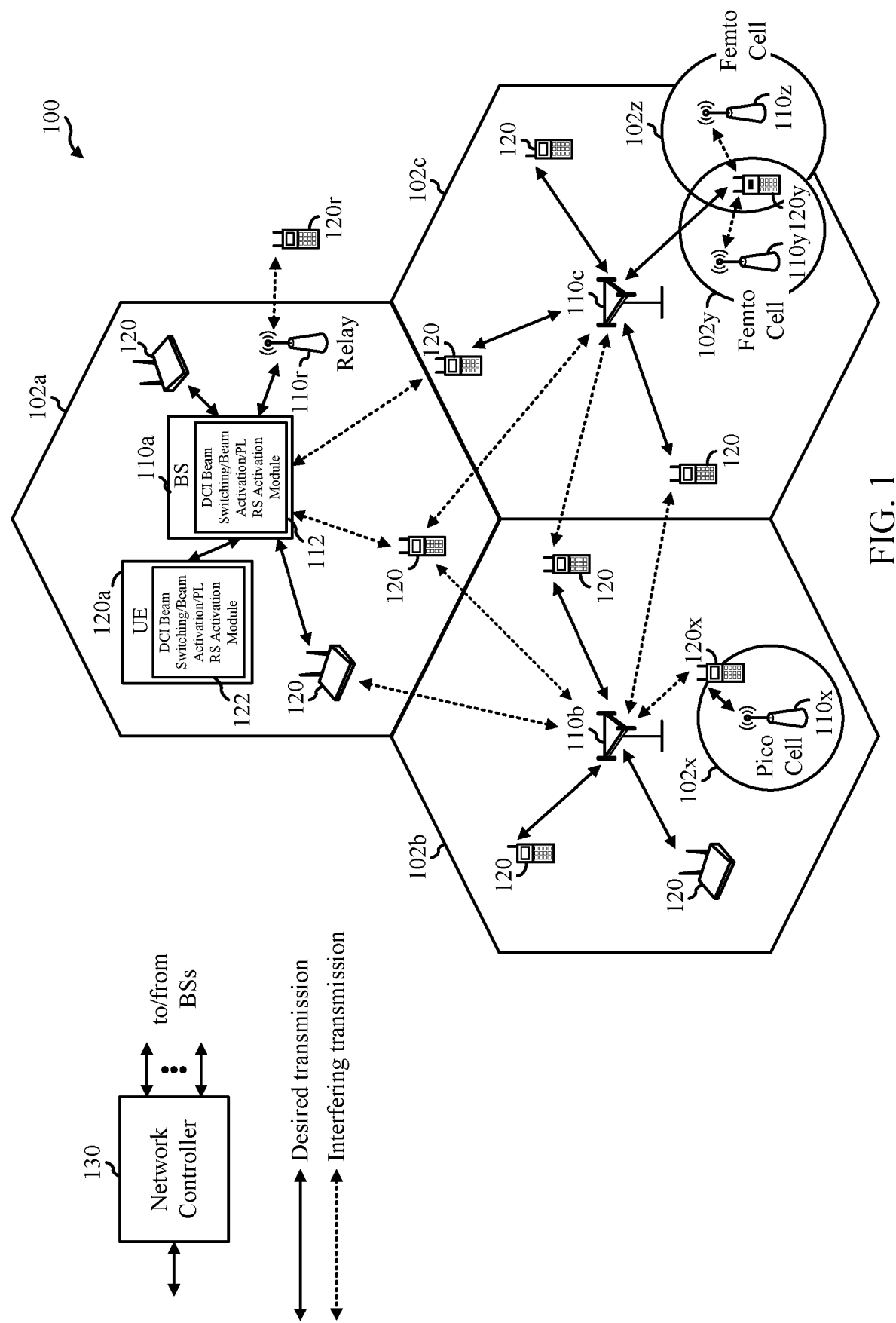
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a DCI Beam Switching/Beam Activation/PL RS Activation Module 122 that may be configured to perform (or cause UE 120a to perform) operations 400 of FIG. 4. Similarly, base station 110a may include a DCI Beam Switching/Beam Activation/PL RS Activation Module 112 that may be configured to perform (or cause BS 110a to perform) operations 500 of FIG. 5 (e.g., to signal enablement or disablement of DCI-based beam and/or PL RS activation to a UE performing operations 400).

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
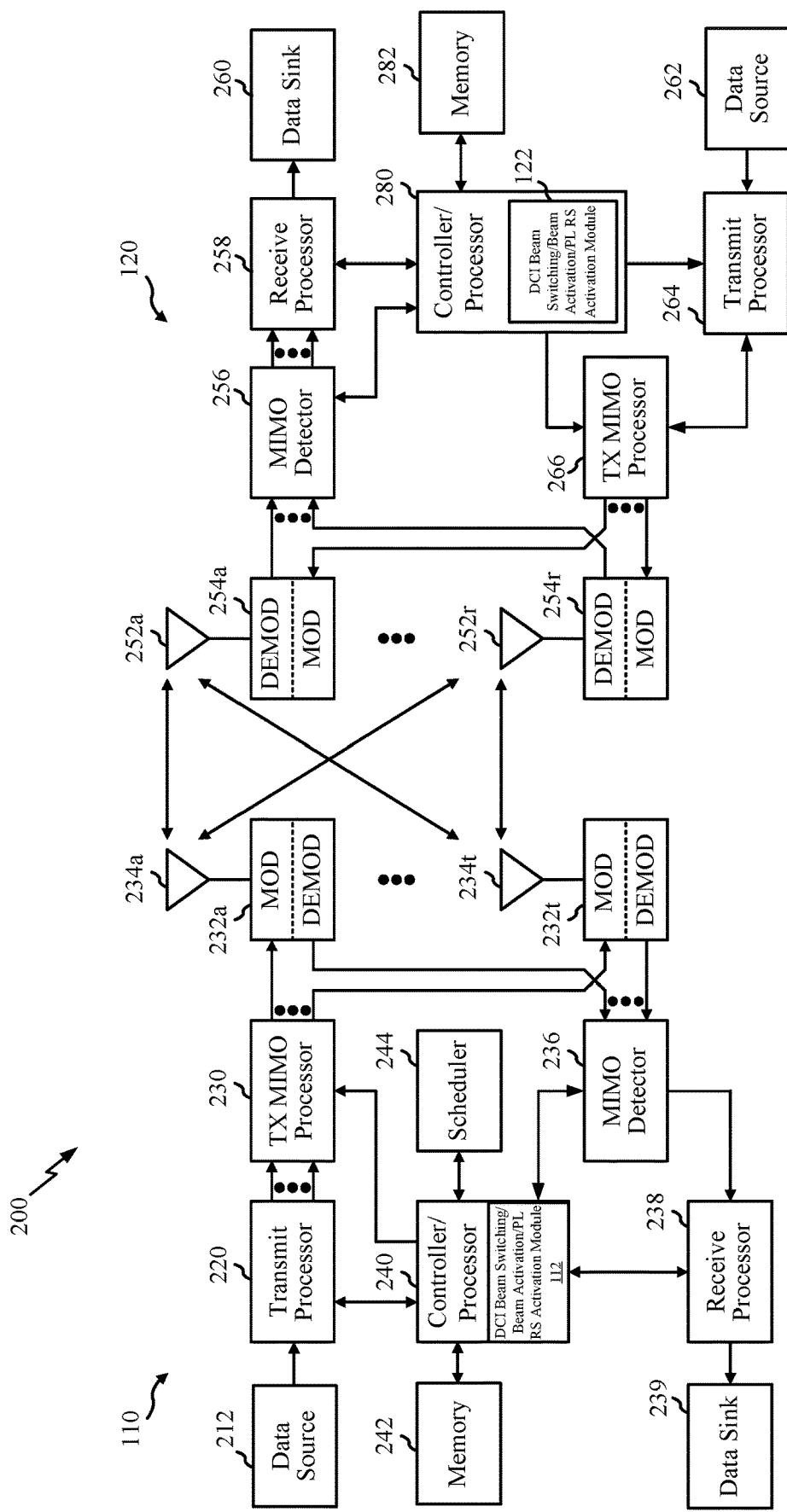
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH)) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a DCI Beam Switching/Beam Activation/PL RS Activation Module 122 that may be configured to perform operations 400 of FIG. 4, while the controller/processor 240 of the BS 110 has a DCI Beam Switching/Beam Activation/PL RS Activation Module 112 that may be configured to perform operations 500 of FIG. 5, as discussed in further detail below. Although shown at the Controller/Processor, other components of the UE or BS may be used to perform the operations described herein.

Figure 3:
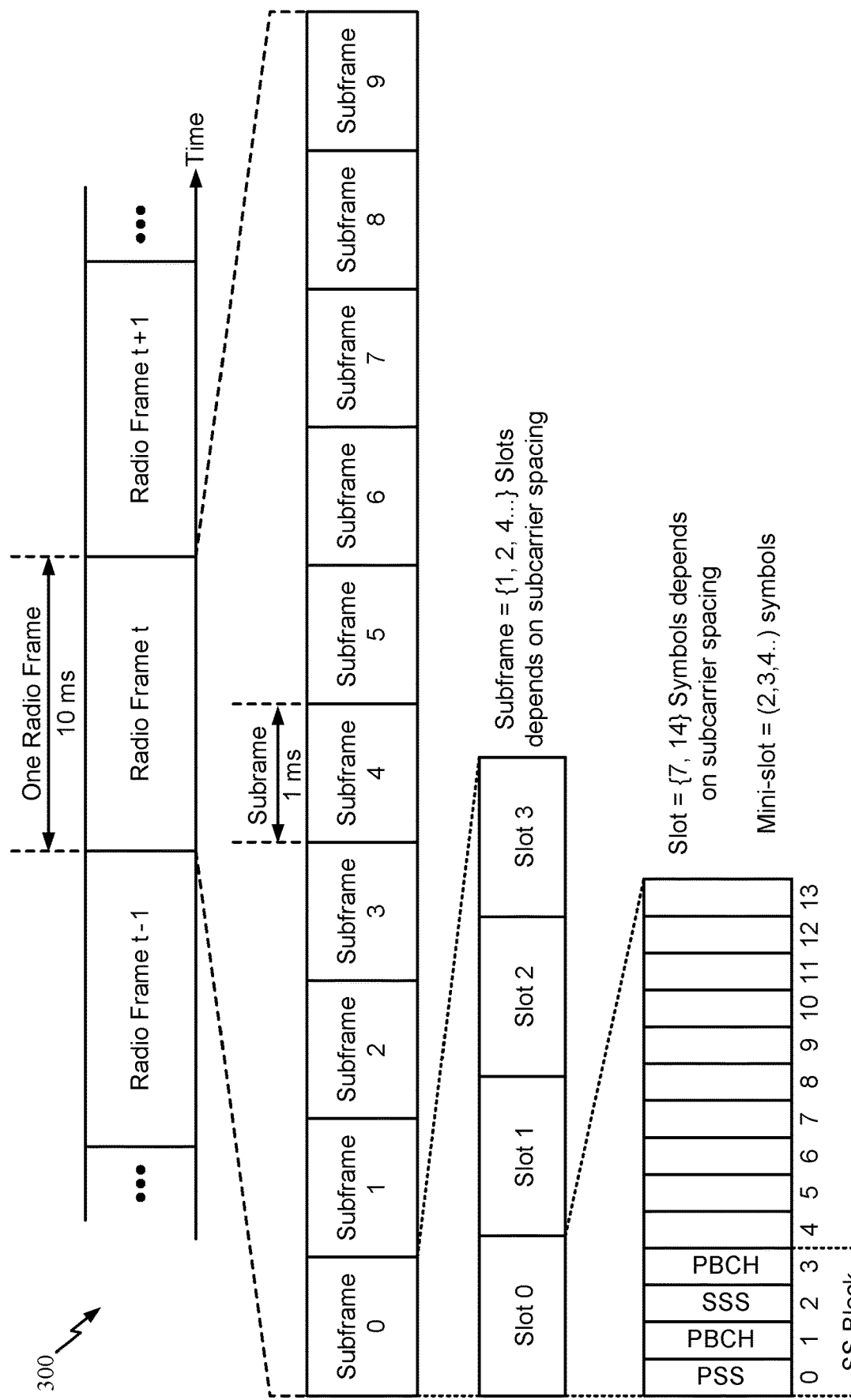
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for Enabling Downlink Control Information (DCI) Based Beam and Path Loss (PL) Reference Signal (RS) Activation Aspects of the present disclosure provide apparatus, methods, processing systems, and computer readable mediums for enabling downlink control information (DCI) based beam and path loss (PL) reference signal (RS) activation. As will be described in further detail herein, the techniques described herein may allow for reduced latency in applying a beam switching, beam activation, or PL RS activation command.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

In multi-beam operation (e.g., involving FR1 and FR2 bands), more efficient uplink/downlink beam management may allow for increased intra-cell and inter-cell mobility and/or a larger number of transmission configuration indicator (TCI) states. For example, the states may include the use of a common beam for data and control transmission and reception for UL and DL operations, a unified TCI framework for UL and DL beam indication, and enhanced signaling mechanisms to improve latency and efficiency (e.g., dynamic usage of control signaling).

Some features may facilitate UL beam selection for UEs equipped with multiple panels. For example, UL beam selection may be facilitated through UL beam indication based on a unified TCI framework, enabling simultaneous transmission across multiple panels, and enabling fast panel selection. Further, UE-initiated or L1-event-driven beam management may also reduce latency and the probability that beam failure events occur.

Additional techniques for multi-TRP deployment may target both FR1 and FR2 bands. These techniques may improve reliability and robustness for channels other than the PDSCH (e.g., PDCCH, PUSCH, and PUCCH) using multi-TRP and/or multi-panel operations. These enhancements may enable inter-cell multi-TRP operations and may allow for simultaneous multi-TRP transmission with multi-panel reception.

In Rel-15/16, media access control (MAC) control elements (CEs) may be used to switch beams (e.g., for PDCCH and PUCCH), activate PDSCH beams, and activate PUSCH/SRS PL RSs. The PL RSs may be downlink signals transmitted from a network entity (e.g., a gNodeB) to a UE and may be used by a UE to determine power control parameters for uplink transmissions. The use of MAC-CEs may introduce an amount of latency for a UE to apply a received beam or PL RS activation command (e.g., a 3 ms activation latency). The latency introduced by the use of MAC-CEs may include a time needed to process signals received at higher levels of a network stack (e.g., to process a received signal at the physical layer and then at the MAC layer in order to decode the content of the MAC-CE(s)). For example, in some systems, there may be up to a 3 millisecond delay between receipt of a command in a MAC-CE and the application or execution of such a command.

To reduce latency in processing and applying beam switching, beam activation, and PL RS activation commands, higher layers, such as the physical layer, may be used to carry beam switching, beam activation, and PL RS activation commands. For example, these commands may be included in downlink control information (DCI) or in other PHY layer signaling. In such a case, the beam switching, beam activation, and PL RS activation commands may be recovered by decoding the received commands at the PHY layer without needing to perform further processing at lower levels of the network stack. However, some UEs may not support DCI-based beam switching, beam activation, and PL RS activation. Thus, for these UEs, beam switching, beam activation, and PL RS activation commands may still need to be carried in lower layer signaling in the network stack (e.g., in MAC-CEs).

Figure 4:
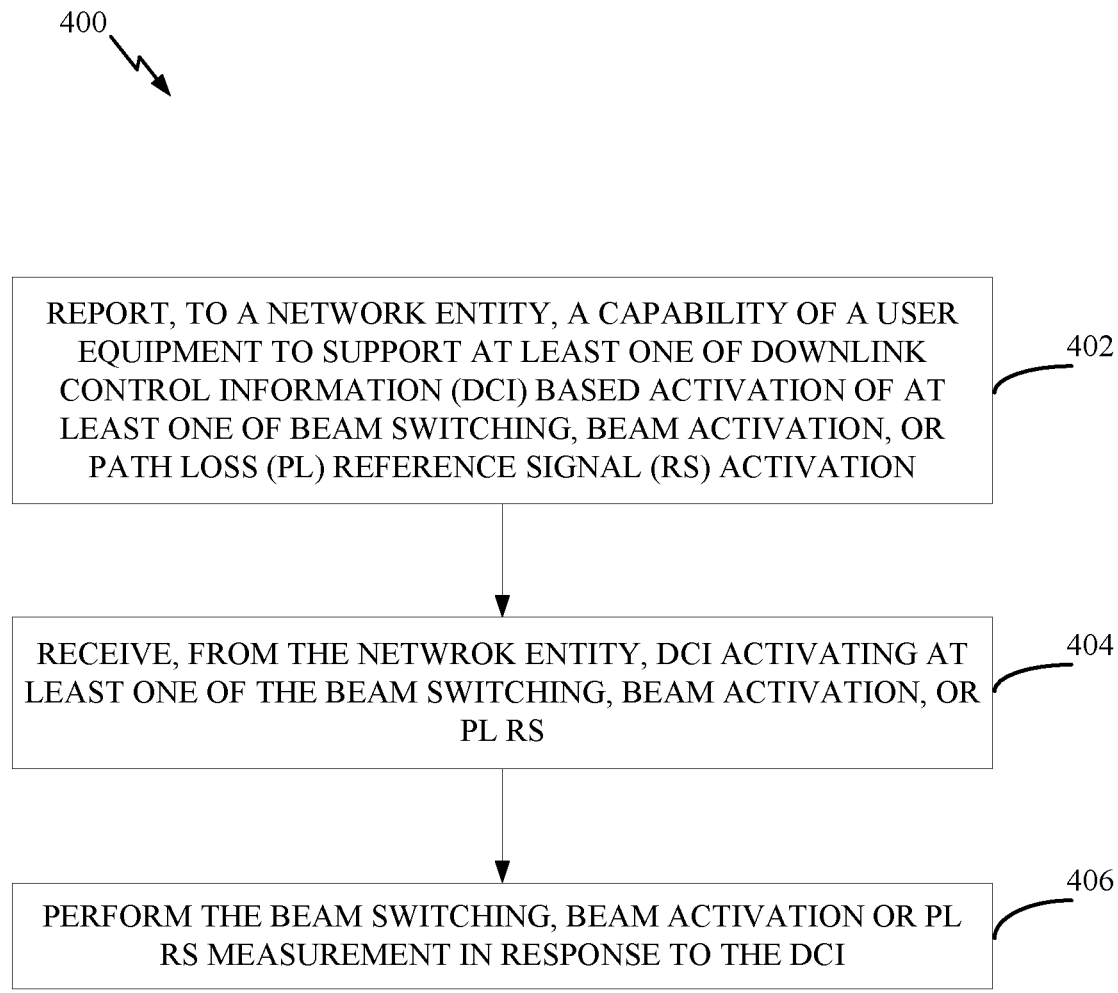
FIG. 4 illustrates example operations for wireless communication by a user equipment (UE), in accordance with some aspects of the present disclosure.

FIG. 4 illustrates example operations 400 for wireless communication by a UE, in accordance with some aspects of the present disclosure. For example, operations 400 may be performed by a UE 120a of FIG. 1 to enable downlink control information (DCI) based beam and path loss (PL) reference signal (RS) activation.

Operations 400 begin, at block 402, where a UE reports, to a network entity, a capability of the UE to support at least one of downlink control information (DCI) based activation of at least one of beam switching, beam activation, or path loss (PL) reference signal (RS) activation. The report of the capability to support at least one of DCI-based activation of beam switching, beam activation, or PL RS activation may include an explicit or implicit indication carried in uplink signaling. An explicit indication may be, for example, one or more bits indicating a capability for supporting DCI-based beam switching, beam activation, and/or PL RS activation. An implicit indication may be, for example, some other indication that is associated with a UE capability for supporting DCI-based beam switching, beam activation, and/or PL RS activation. The capability may be a single capability for supporting DCI-based beam switching, beam activation, and PL RS activation, or may be individual capability indications, as discussed in further detail below.

At block 404, the UE receives, from the network entity, DCI activating at least one of the beam switching, beam activation, or PL RS. The DCI activating at least one of the beam switching, beam activation or PL RS is generally based on the UE report of the capability to support at least one of downlink control information (DCI) based activation of at least one of beam switching, beam activation, or path loss (PL) reference signal (RS) activation.

At block 406, the UE performs the beam switching, beam activation, or PL RS measurement in response to the DCI.

Figure 5:
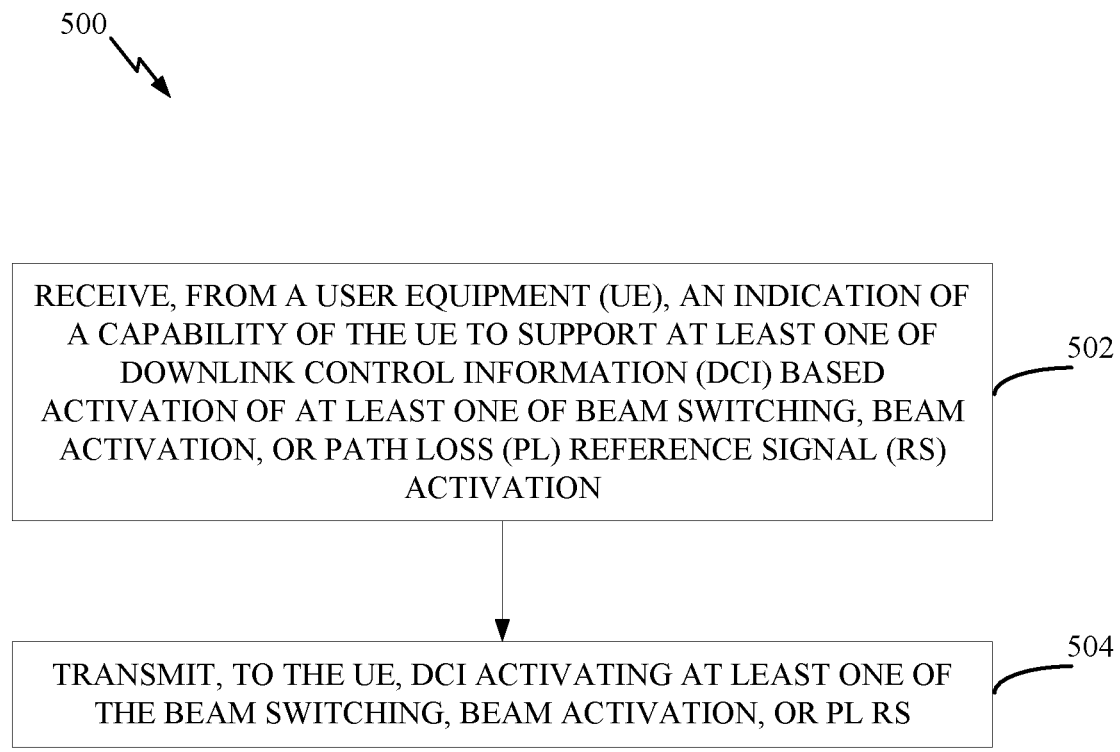
FIG. 5 illustrates example operations for wireless communication by a network entity, in accordance with some aspects of the present disclosure.

FIG. 5 illustrates example operations 500 for wireless communication by a network entity, in accordance with some aspects of the present disclosure. For example, operations 500 may be performed by a gNodeB 110 of FIG. 1 to enable downlink control information (DCI) based beam and path loss (PL) reference signal (RS) activation.

Operations 500 may begin at block 502, where a network entity receives, from a user equipment (UE), an indication of a capability of the UE to support at least one of downlink control information (DCI) based activation of at least one of beam switching, beam activation, or path loss (PL) reference signal (RS) activation. The indication can be an explicit indication of UE capability for support of one or more of the activations, or an implicit indication of UE capability for support of one or more of the activations (for example, an indication of UE support of a mode, where the mode includes support of one or more of the activations), or other indication.

At block 504, the network entity transmits, to the UE, DCI activating at least one of the beam switching, beam activation, or PL RS. The DCI activating at least one of the beam switching, beam activation, or PL RS may include one or more indications of activating beam switching, beam activation, and/or PL RS based on the received indication of the UE capability.

The UE may report various capabilities to support DCI-based beam activation. The UE may report one or more of a capability to support DCI based activation of PDCCH TCI state, DCI based activation of PDSCH and/or CSI-RS TCI states, DCI based activation of spatial relations for PUCCH and/or SRS, or DCI based activation of UL TCI state for PUCCH, PUSCH, PRACH, and/or SRS. An UL TCI state generally includes or is otherwise associated with a source reference signal that indicates an uplink transmission beam for a target uplink reference signal or channel. The source reference signal may include, for example, an SRS, an SSB, a CSI-RS, or other appropriate reference signals. The UE may also or alternatively report a capability to support DCI based activation of PL RSs for PUCCH, SRS, and/or PUSCH.

In some embodiments, the UE may report its support of DCI based beam activation, beam switching, and PL RS switching based on a number of capabilities supported by the UE. The UE may support one capability for all DCI based activations. In such a case, the UE may report a single indication of a capability, where a first value indicates that a UE supports beam switching, beam activation, and PL RS activation and a second value indicates that the UE does not support any of beam switching, beam activation, or PL RS activation. In another example, the UE may support different capabilities for DCI-based beam activation and DCI-based PL RS activation. In such a case, the UE may report its capability to support DCI-based based beam activations independently of a report of the UE capability to support DCI-based PL RS activations. In still another example, the UE may support individual capabilities for each DCI-based activation discussed above. In such a case, the UE may individually report its capabilities to support DCI-based beam switching, DCI-based beam activation, and DCI-based PL RS activation.

In some embodiments, the network entity may indicate, to a UE, the enablement of a corresponding activation via radio resource control (RRC) signaling, a MAC-CE, or DCI signaling. The indication may be based on configurations of an RRC parameter, where a first value or configuration of the RRC parameter indicates activation of DCI-based beam switching, beam activation, and/or PL RS activation, and a second value or configuration of the RRC parameter indicates deactivation of DCI-based beam switching, beam activation, and/or PL RS activation. After receiving, from the network entity, the enablement indication, the UE may be ready to receive corresponding new DCI formats. If existing DCI formats are reused, the UE may be ready to re-interpret reserved bits in these existing DCI formats or assume the existence of new configurable fields.

Figure 6:
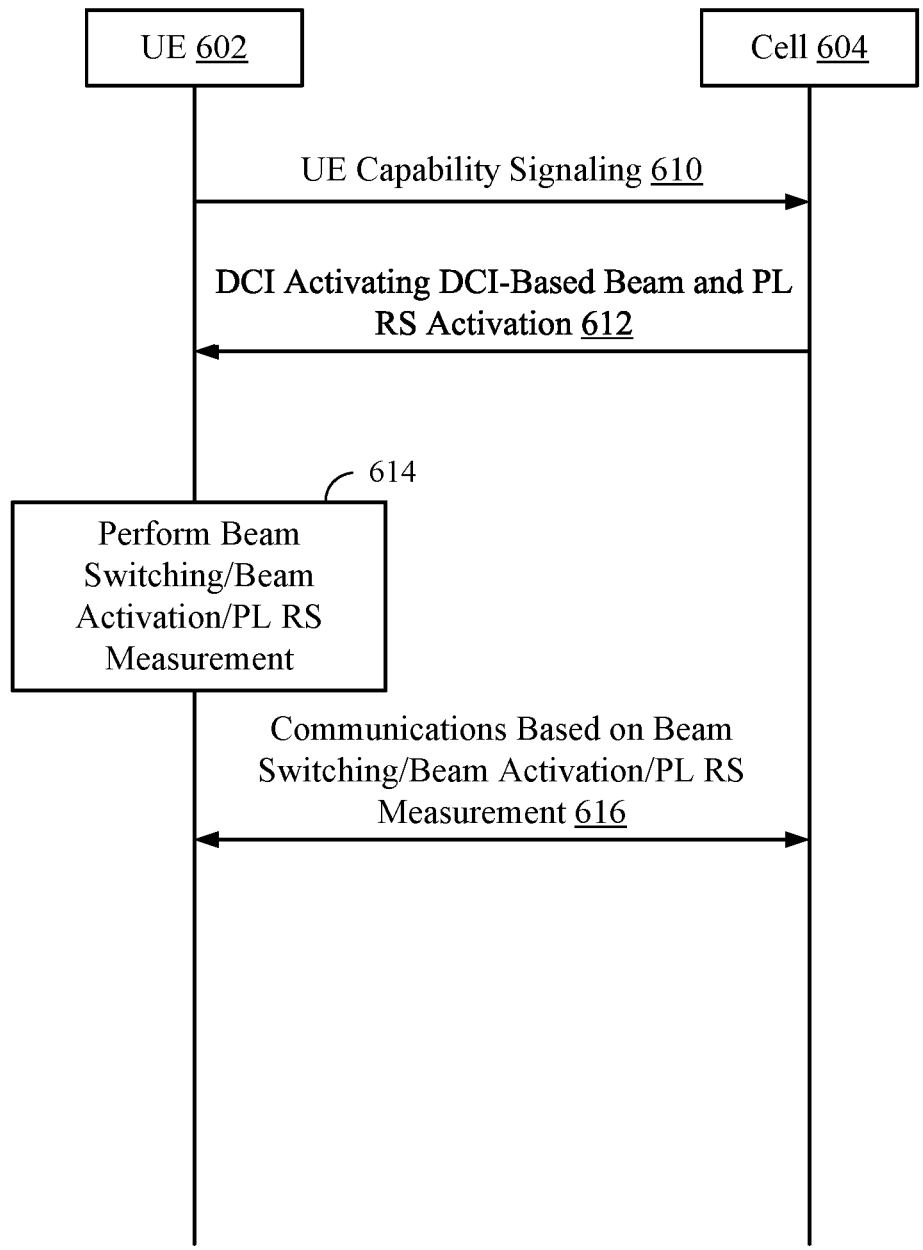
FIG. 6 is a call flow diagram illustrating messages exchanged between a user equipment (UE) and network entities for enabling DCI-based beam and/or path loss (PL) reference signal (RS) activation, in accordance with some aspects of the present disclosure.

FIG. 6 is a call flow diagram illustrating an example of enabling DCI-based activation of beam switching, beam activation, and/or PL RS activation based on UE signaling. As illustrated, a UE 602 transmits, to cell 604, UE capability signaling 610. UE capability signaling 610 generally includes information identifying a UE capability for DCI-based activation of beam switching, DCI-based beam activation, and/or DCI-based PL RS activation. The information carried in UE capability signaling 610 may be a single indicator indicating that the UE supports beam switching, beam activation, and PL RS activation or that the UE does not support any of beam switching, beam activation, or PL RS activation; a first indicator associated with support for DCI-based beam activation and a second indicator associated with support for DCI-based PL RS activation; or individual capability reports for support for DCI-based beam switching, DCI-based beam activation, and DCI-based PL RS activation.

Cell 604 receives UE capability signaling 610 (indicating UE support for at least one of DCI-based beam switching, DCI-based beam activation, or DCI-based PL RS activation)

and, in response, transmits a DCI to cell 604. The DCI 612 generally indicates to the UE 602 activation of DCI-based beam switching, DCI-based beam activation, and/or DCI-based PL RS activation. Subsequently, at block 614, the UE performs beam switching, beam activation, and/or PL RS measurement based on the activation of DCI-based beam switching, DCI-based beam activation, and/or DCI-based PL RS activation signaled in DCI 612. The UE 602 and cell 604 subsequently communicate 616 based on the beam switching, beam activation, and/or PL RS measurements performed at block 614.

Figure 7:
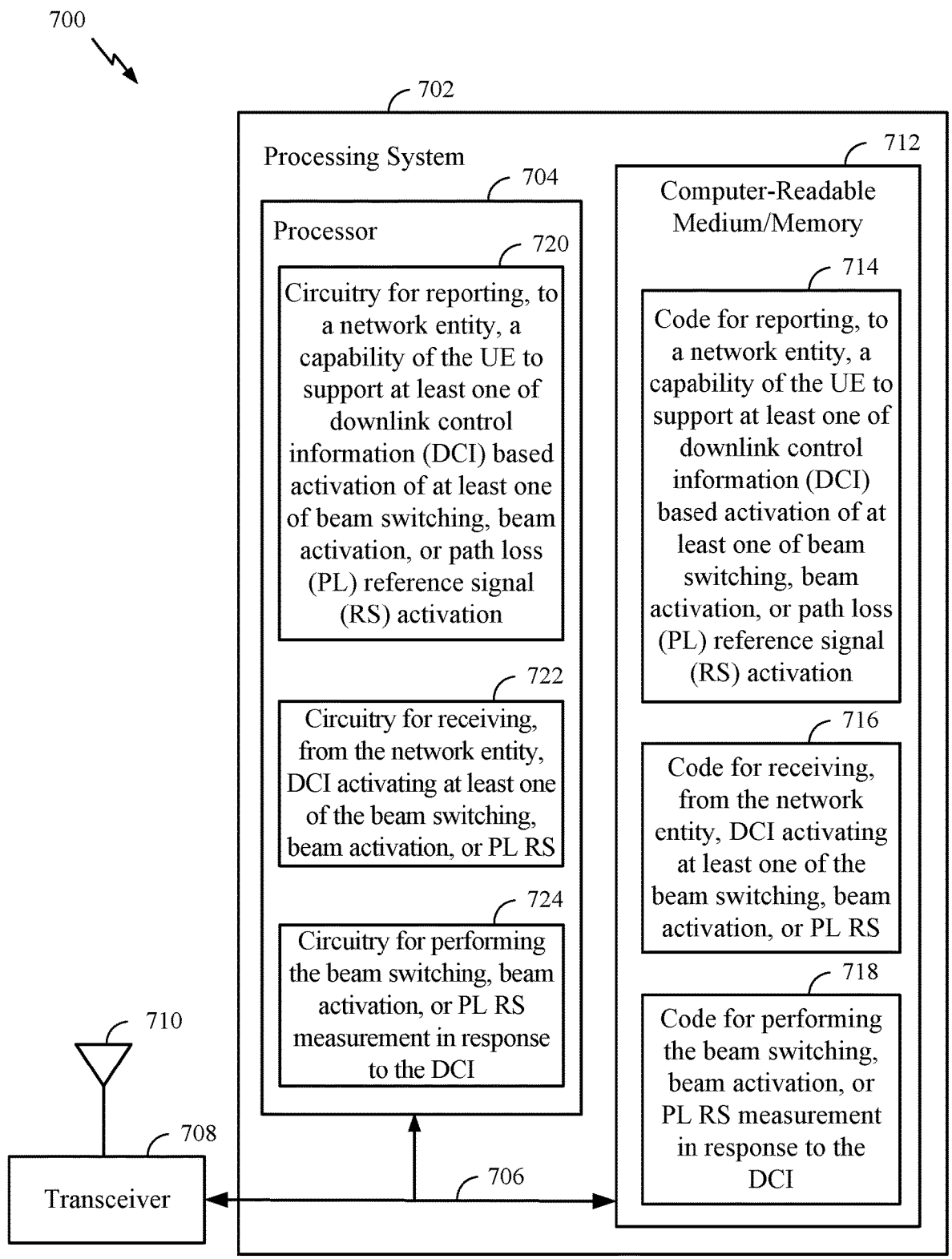
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for enabling downlink control information (DCI) based beam and path loss (PL) reference signal (RS) activation. In certain aspects, computer-readable medium/memory 712 stores code 714 for reporting, to a network entity, a capability of the UE to support at least one of downlink control information (DCI) based activation of at least one of beam switching, beam activation, or path loss (PL) reference signal (RS) activation; code 716 for receiving, from the network entity, DCI activating at least one of the beam switching, beam activation, or PLRS; and code 718 for performing the beam switching, beam activation, or PL RS measurement in response to the DCI, in accordance with aspects of the present disclosure. In certain aspects, the processor 704 has circuitry configured to implement the code stored in the computer-readable medium/memory 712. The processor 704 includes circuitry 720 for reporting, to a network entity, a capability of the UE to support at least one of downlink control information (DCI) based activation of at least one of beam switching, beam activation, or path loss (PL) reference signal (RS) activation; circuitry 722 for receiving, from the network entity, DCI activating at least one of the beam switching, beam activation, or PLRS; and circuitry 724 for performing the beam switching, beam activation, or PL RS measurement in response to the DCI, in accordance with aspects of the present disclosure.

Figure 8:
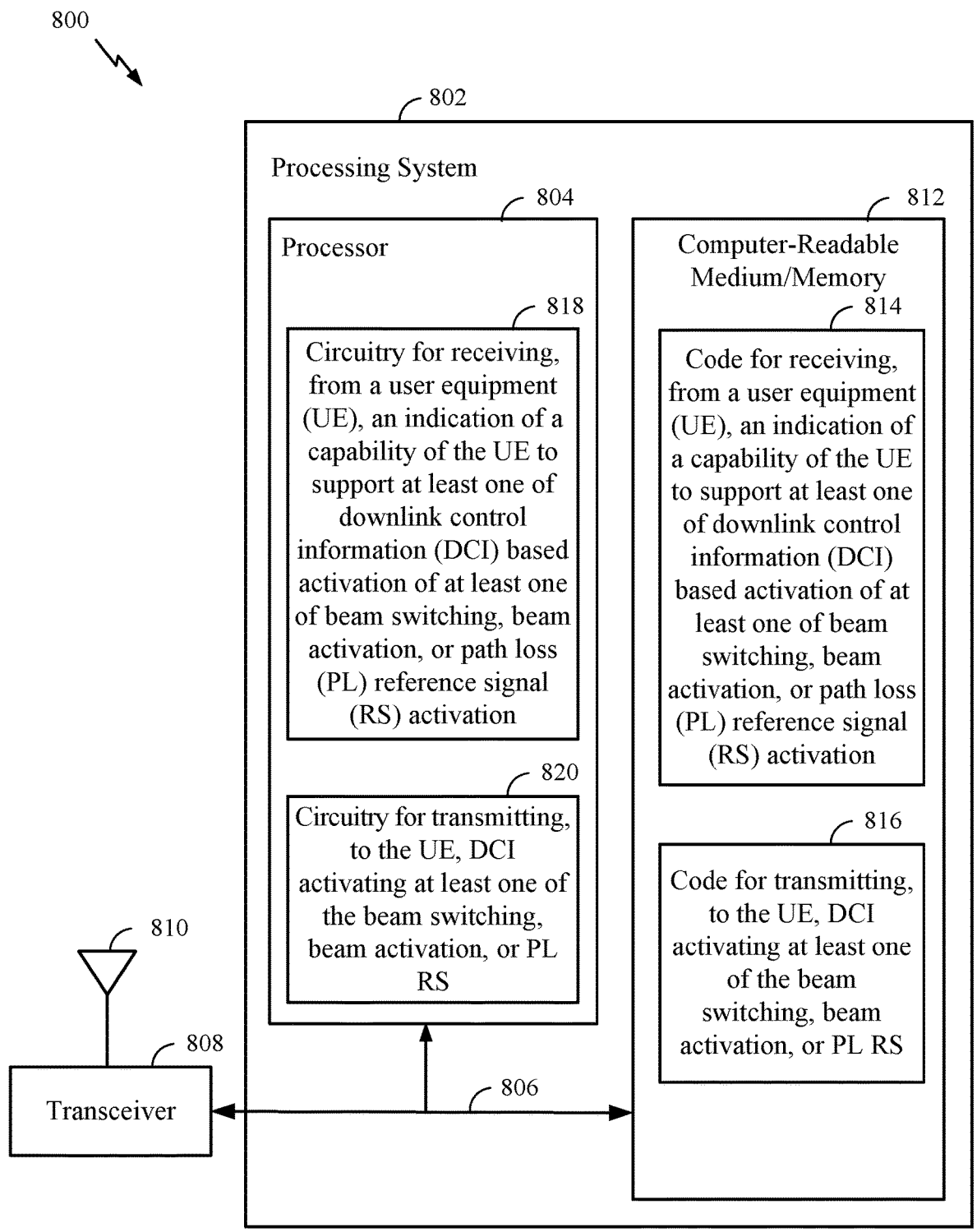
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for enabling downlink control information (DCI) based beam and path loss (PL) reference signal (RS) activation. In certain aspects, computer-readable medium/memory 812 stores code 814 for receiving, from a user equipment (UE), an indication of a capability of the UE to support at least one of downlink control information (DCI) based activation of at least one of beam switching, beam activation, or path loss (PL) reference signal (RS) activation; and code 816 for transmitting, to the UE, DCI activating at least one of the beam switching, beam activation, or PL RS, in accordance with aspects of the present disclosure. In certain aspects, the processor 804 has circuitry configured to implement the code stored in the computer-readable medium/memory 812. The processor 804 includes circuitry 818 for receiving, from a user equipment (UE), an indication of a capability of the UE to support at least one of downlink control information (DCI) based activation of at least one of beam switching, beam activation, or path loss (PL) reference signal (RS) activation; and circuitry 820 for transmitting, to the UE, DCI activating at least one of the beam switching, beam activation, or PL RS, in accordance with aspects of the present disclosure.

Example Embodiments

Embodiment 1: A method for wireless communications by a user equipment (UE), comprising: reporting, to a network entity, a capability of the UE to support at least one of downlink control information (DCI) based activation of at least one of beam switching, beam activation, or path loss (PL) reference signal (RS) activation; receiving, from the network entity, DCI activating at least one of the beam switching, beam activation, or PL RS; and performing the beam switching, beam activation, or PL RS measurement in response to the DCI.

Embodiment 2: The method of Embodiment 1, wherein reporting the capability of the UE comprises indicating a capability of DCI based activation of physical downlink control channel (PDCCH) transmission configuration information (TCI) state.

Embodiment 3: The method of Embodiment 1, wherein reporting the capability of the UE comprises indicating a capability of DCI based activation of physical downlink shared channel (PDSCH) or channel state information reference signal (CSI-RS) TCI states.

Embodiment 4: The method of Embodiment 1, wherein reporting the capability of the UE comprises indicating a capability of DCI based activation of spatial relations for one or more of a physical uplink control channel (PUCCH) or sounding reference signals (SRSs).

Embodiment 5: The method of Embodiment 1, wherein reporting the capability of the UE comprises indicating a capability of DCI based activation of UL TCI state for one or more of a PUCCH, physical uplink shared channel (PUSCH), physical random access channel (PRACH), or SRS.

Embodiment 6: The method of Embodiment 1, wherein reporting the capability of the UE comprises indicating a capability of DCI based activation of PL RSs for one or more of a physical uplink control channel (PUCCH), sounding reference signals (SRSs), or a physical uplink shared channel (PUSCH).

Embodiment 7: The method of Embodiment 1, wherein the capability of the UE to support at least one of DCI based activation of at least one of beam switching, beam activation, or PL RS activation comprises a single capability for any DCI based activation.

Embodiment 8: The method of Embodiment 1, wherein the capability of the UE to support at least one of DCI based activation of at least one of beam switching, beam activation, or PL RS activation comprises: a first capability associated with DCI based beam activations, and a second capability associated with DCI based PL RS activations.

Embodiment 9: The method of Embodiment 1, wherein the capability of the UE to support at least one of DCI based activation of at least one of beam switching, beam activation, or PL RS activation comprises a capability associated with each DCI based beam or PL RS activation.

Embodiment 10: The method of any of Embodiments 1 through 9, further comprising receiving, from the network entity, an enablement indication of a DCI based activation of at least one of the beam switching, beam activation, or PL RS activation via one or more of radio resource control (RRC) signaling, a media access control (MAC) control element (CE) signaling, or DCI signaling.

Embodiment 11: The method of Embodiment 10, wherein the indication is based on a configuration of an RRC parameter.

Embodiment 12: The method of Embodiments 10 or 11, further comprising: based on receipt of the enablement indication, receiving signaling in one or more DCI formats associated with the DCI based activation of at least one of the beam switching, beam activation, or PL RS activation.

Embodiment 13: The method of Embodiments 10 or 11, further comprising: based on receipt of the enablement indication: receiving signaling in one or more preexisting DCI formats, and one or more of re-interpreting reserved bits or assuming an existence of new configurable fields in the received signaling.

Embodiment 14: A method for wireless communications by a network entity, comprising: receiving, from a user equipment (UE), an indication of a capability of the UE to support at least one of downlink control information (DCI) based activation of at least one of beam switching, beam activation, or path loss (PL) reference signal (RS) activation; and transmitting, to the UE, DCI activating at least one of the beam switching, beam activation, or PL RS.

Embodiment 15: The method of Embodiment 14, wherein the indication of the capability of the UE comprises an indication of a capability to support DCI based activation of physical downlink control channel (PDCCH) transmission configuration information (TCI) state.

Embodiment 16: The method of Embodiment 14, wherein the indication of the capability of the UE comprises an indication of a capability to support DCI based activation of physical downlink shared channel (PDSCH) or channel state information reference signal (CSI-RS) TCI states.

Embodiment 17: The method of Embodiment 14, wherein the indication of the capability of the UE comprises an indication of a capability to support DCI based activation of spatial relations for one or more of a physical uplink control channel (PUCCH) or sounding reference signals (SRSs).

Embodiment 18: The method of Embodiment 14, wherein the indication of the capability of the UE comprises an indication of a capability to support DCI based activation of UL TCI state for one or more of a PUCCH, physical uplink shared channel (PUSCH), physical random access channel (PRACH), or SRS.

Embodiment 19: The method of Embodiment 14, wherein the indication of the capability of the UE comprises an indication of a capability to support DCI based activation of PL RSs for one or more of a physical uplink control channel (PUCCH), sounding reference signals (SRSs), or a physical uplink shared channel (PUSCH).

Embodiment 20: The method of Embodiment 14, wherein the indication of the capability of the UE comprises an indication of a single capability for any DCI based activation.

Embodiment 21: The method of Embodiment 14, wherein the indication of the capability of the UE comprises an indication of: a first capability associated with DCI based beam activations, and a second capability associated with DCI based PL RS activations.

Embodiment 22: The method of Embodiment 14, wherein the indication of the capability of the UE comprises an indication of a capability associated with each DCI based beam or PL RS activation.

Embodiment 23: The method of any of Embodiments 14 through 22, further comprising transmitting, to the UE, an enablement indication of a DCI based activation of at least one of the beam switching, beam activation, or PL RS activation via one or more of radio resource control (RRC) signaling, a media access control (MAC) control element (CE) signaling, or DCI signaling.

Embodiment 24: The method of Embodiment 23, wherein the indication is based on a configuration of an RRC parameter.

Embodiment 25: The method of Embodiments 23 or 24, further comprising: subsequent to transmission of the enablement indication, transmitting signaling in one or more DCI formats associated with the DCI based activation of at least one of the beam switching, beam activation, or PL RS activation.

Embodiment 26: The method of Embodiments 23 or 24, further comprising: subsequent to transmission of the enablement indication, transmitting signaling in one or more preexisting DCI formats, wherein one or more reserved bits are to be re-interpreted or existence of one or more new configurable fields is to be assumed.

Embodiment 27: An apparatus for wireless communications by a user equipment (UE), comprising: a processor; and a memory having instructions which, when executed by the processor, performs the operations of any of Embodiments 1 through 13.

Embodiment 28: An apparatus for wireless communications by a network entity, comprising: a processor; and a memory having instructions which, when executed by the processor, performs the operations of any of Embodiments 14 through 26.

Embodiment 29: An apparatus for wireless communications by a user equipment (UE), comprising: means capable of performing the operations of any of Embodiments 1 through 13.

Embodiment 30: An apparatus for wireless communications by a network entity, comprising: means capable of performing the operations of any of Embodiments 14 through 26

Embodiment 31: A computer-readable medium having instructions stored thereon which, when executed by a processor, performs the operations of any of Embodiments 1 through 13.

Embodiment 32: A computer-readable medium having instructions stored thereon which, when executed by a processor, performs the operations of any of Embodiments 14 through 26.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   reporting, to a network entity, a capability of the UE to support at least one of downlink control information (DCI) based activation of at least one of beam switching, beam activation, or path loss (PL) reference signal (RS) activation;
   receiving, from the network entity, DCI activating at least one of the beam switching, beam activation, or PL RS; and
   performing the beam switching, beam activation, or PL RS measurement in response to the DCI, wherein the capability of the UE to support at least one of DCI based activation of at least one of beam switching, beam activation, or PL RS activation comprises:
      a first capability associated with DCI based beam activations, and
      a second capability associated with DCI based PL RS activations.

2. The method of claim 1, wherein reporting the capability of the UE comprises indicating a capability of DCI based activation of physical downlink control channel (PDCCH) transmission configuration information (TCI) state.

3. The method of claim 1, wherein reporting the capability of the UE comprises indicating a capability of DCI based activation of physical downlink shared channel (PDSCH) or channel state information reference signal (CSI-RS) transmission configuration information (TCI) states.

4. The method of claim 1, wherein reporting the capability of the UE comprises indicating a capability of DCI based activation of spatial relations for one or more of a physical uplink control channel (PUCCH) or sounding reference signals (SRSs).

5. The method of claim 1, wherein reporting the capability of the UE comprises indicating a capability of DCI based activation of uplink (UL) transmission configuration information (TCI state for one or more of a physical uplink control channel (PUCCH), physical uplink shared channel (PUSCH), physical random access channel (PRACH), or sounding reference signal (SRS).

6. The method of claim 1, wherein reporting the capability of the UE comprises indicating a capability of DCI based activation of PL RSs for one or more of a physical uplink control channel (PUCCH), sounding reference signals (SRSs), or a physical uplink shared channel (PUSCH).

7. The method of claim 1, wherein the capability of the UE to support at least one of DCI based activation of at least one of beam switching, beam activation, or PL RS activation comprises a capability associated with each DCI based beam or PL RS activation.

8. The method of claim 1, further comprising receiving, from the network entity, an enablement indication of a DCI based activation of at least one of the beam switching, beam activation, or PL RS activation via one or more of radio resource control (RRC) signaling, a media access control (MAC) control element (CE) signaling, or DCI signaling.

9. The method of claim 8, wherein the indication is based on a configuration of an RRC parameter.

10. The method of claim 8, further comprising:
based on receipt of the enablement indication, receiving signaling in one or more DCI formats associated with the DCI based activation of at least one of the beam switching, beam activation, or PL RS activation.

11. The method of claim 8, further comprising:
based on receipt of the enablement indication:
receiving signaling in one or more preexisting DCI formats, and
one or more of re-interpreting reserved bits or assuming an existence of new configurable fields in the received signaling.

12. A method for wireless communications by a network entity, comprising:
receiving, from a user equipment (UE), an indication of a capability of the UE to support at least one of downlink control information (DCI) based activation of at least one of beam switching, beam activation, or path loss (PL) reference signal (RS) activation; and
transmitting, to the UE, DCI activating at least one of the beam switching, beam activation, or PL RS, wherein the indication of the capability of the UE comprises an indication of:
a first capability associated with DCI based beam activations, and
a second capability associated with DCI based PL RS activations.

13. The method of claim 12, wherein the indication of the capability of the UE comprises an indication of a capability to support DCI based activation of physical downlink control channel (PDCCH) transmission configuration information (TCI) state.

14. The method of claim 12, wherein the indication of the capability of the UE comprises an indication of a capability to support DCI based activation of physical downlink shared channel (PDSCH) or channel state information reference signal (CSI-RS) transmission configuration information (TCI) states.

15. The method of claim 12, wherein the indication of the capability of the UE comprises an indication of a capability to support DCI based activation of spatial relations for one or more of a physical uplink control channel (PUCCH) or sounding reference signals (SRSs).

16. The method of claim 12, wherein the indication of the capability of the UE comprises an indication of a capability to support DCI based activation of uplink (UL) transmission configuration information TCI state for one or more of a physical uplink control channel (PUCCH), physical uplink shared channel (PUSCH), physical random access channel (PRACH), or sounding reference signal (SRS).

17. The method of claim 12, wherein the indication of the capability of the UE comprises an indication of a capability to support DCI based activation of PL RSs for one or more of a physical uplink control channel (PUCCH), sounding reference signals (SRSs), or a physical uplink shared channel (PUSCH).

18. The method of claim 12, wherein the indication of the capability of the UE comprises an indication of a capability associated with each DCI based beam or PL RS activation.

19. The method of claim 12, further comprising transmitting, to the UE, an enablement indication of a DCI based activation of at least one of the beam switching, beam activation, or PL RS activation via one or more of radio resource control (RRC) signaling, a media access control (MAC) control element (CE) signaling, or DCI signaling.

20. The method of claim 19, wherein the indication is based on a configuration of an RRC parameter.

21. The method of claim 19, further comprising:
subsequent to transmission of the enablement indication, transmitting signaling in one or more DCI formats associated with the DCI based activation of at least one of the beam switching, beam activation, or PL RS activation.

22. The method of claim 19, further comprising:
subsequent to transmission of the enablement indication, transmitting signaling in one or more preexisting DCI formats, wherein one or more reserved bits are to be re-interpreted or existence of one or more new configurable fields is to be assumed.

23. An apparatus for wireless communications by a user equipment (UE), comprising:
a transmitter configured to report, to a network entity, a capability of the UE to support at least one of downlink control information (DCI) based activation of at least one of beam switching, beam activation, or path loss (PL) reference signal (RS) activation;
a receiver configured to receive, from the network entity, DCI activating at least one of the beam switching, beam activation, or PL RS; and
a processing system configured to performing the beam switching, beam activation, or PL RS measurement in response to the DCI, wherein the capability of the UE to support at least one of DCI based activation of at least one of beam switching, beam activation, or PL RS activation comprises:
a first capability associated with DCI based beam activations, and
a second capability associated with DCI based PL RS activations.

24. The apparatus of claim 23, wherein the receiver is further configured to receive, from the network entity, an enablement indication of a DCI based activation of at least one of the beam switching, beam activation, or PL RS activation via one or more of radio resource control (RRC)

signaling, a media access control (MAC) control element (CE) signaling, or DCI signaling.

25. The apparatus of claim 24, wherein the receiver is further configured to receive, based on receipt of the enablement indication, signaling in one or more DCI formats associated with the DCI based activation of at least one of the beam switching, beam activation, or PL RS activation.

26. An apparatus for wireless communications by a network entity, comprising:
- a receiver configured to receive, from a user equipment (UE), an indication of a capability of the UE to support at least one of downlink control information (DCI) based activation of at least one of beam switching, beam activation, or path loss (PL) reference signal (RS) activation; and
- a transmitter configured to transmit, to the UE, DCI activating at least one of the beam switching, beam activation, or PL RS, wherein the indication of the capability of the UE comprises an indication of:
  - a first capability associated with DCI based beam activations, and
  - a second capability associated with DCI based PL RS activations.

* * * * *